(12) United States Patent
Benjamin et al.

(10) Patent No.: US 10,884,206 B2
(45) Date of Patent: Jan. 5, 2021

(54) BENDABLE RIBBON FOR OPTICAL FIBER RIBBON CABLE

(71) Applicant: Sterlite Technologies Limited, Aurangabad (IN)

(72) Inventors: Seldon Benjamin, Spring, TX (US); Sravan Kumar, Aurangabad (IN); Kishore Sahoo, Aurangabad (IN)

(73) Assignee: STERLITE TECHNOLOGIES LIMITED, Aurangabad (IN)

( * ) Notice: Subject to any disclaimer, the term of this patent is extended or adjusted under 35 U.S.C. 154(b) by 0 days.

(21) Appl. No.: 16/176,294

(22) Filed: Oct. 31, 2018

(65) Prior Publication Data

US 2019/0369342 A1    Dec. 5, 2019

(51) Int. Cl.
  *G02B 6/44*    (2006.01)
  *G02B 6/38*    (2006.01)

(52) U.S. Cl.
  CPC ......... *G02B 6/4403* (2013.01); *G02B 6/3885* (2013.01)

(58) Field of Classification Search
  None
  See application file for complete search history.

(56) References Cited

U.S. PATENT DOCUMENTS

| 4,199,225 | A | * | 4/1980 | Slaughter | G02B 6/4403 385/113 |
| 5,039,195 | A | * | 8/1991 | Jenkins | G02B 6/4416 174/70 R |
| 2004/0146255 | A1 | * | 7/2004 | Ishikawa | G02B 6/4403 385/114 |

FOREIGN PATENT DOCUMENTS

| FR | 2489002 A1 | * | 2/1982 | ........... G02B 6/4407 |
| JP | 02056510 A | * | 2/1990 | |
| JP | 5577702 B2 | * | 8/2014 | ................ A23J 3/16 |

* cited by examiner

*Primary Examiner* — Chad H Smith (57) ABSTRACT

The present invention discloses a fiber optical cable with a plurality of bendable optical fiber ribbon. The fiber optical cable with bendable ribbons increases the total fiber counts compared to conventional optical fiber ribbon cables by eliminating empty spaces of the conventional cables due to stacking of the ribbons in the cross-sectionally circular shape of the loose tubes and the cable jacket. According to an embodiment of the present invention, a bendable ribbon will further allow ribbon labeling on a flat side of the ribbon.

11 Claims, 11 Drawing Sheets

BENDABLE RIBBON FOR OPTICAL FIBER RIBBON CABLE

CROSS REFERENCE TO RELATED APPLICATIONS

The present invention claims the benefit of Indian Patent Application No. 201811020453 entitled the same filed on May 31, 2018, the entire contents of which are incorporated herein by reference.

TECHNICAL FIELD

This invention relates to optic fiber ribbon cables. More specifically, the present invention relates to optic fiber ribbon cables with bendable ribbon.

BACKGROUND

Optic fiber cables are broadly used to provide fast, high bandwidth data services for telecommunication networks. The optic fibers waveguides or cores are extremely delicate, requiring mechanical protections throughout the length of the cable. Optic fiber ribbon cable is a type of optic fiber cable incorporates a plurality of ribbons for communicating the optical information. Ribbons are formed by disposing a plurality of optic fiber cores in the ribbon matrix. The cores of the ribbons are spaced evenly in a flat array of a common plane directed along the longitude axis of the cable. The ribbon matrix provides structural support and geometrical guide for precisely placing the optic fiber cores evenly across the matrix according to industrial standards. The number of cores within a ribbon may vary, which is usually a number of a power of 2, such as 4, 8, etc.

Conventionally, a plurality of optic fiber ribbons in the optic fiber ribbon cable are stacked together within loose tubes contained in the cable thereby increasing the total fiber counts the cable may carry. In conventional art, the outer dimensions of ribbon matrices are flat with a flat rectangular shape cross-sectionally. The ribbons are stacked on top of the flat side of each ribbon's matrix. The ribbons stacked together are usually of the same fiber count each, therefore the stacked ribbons usually form a rectangular or square shape cross-sectionally. This design is partially due to the fact that the ribbon matrix has a flat rectangular outer dimension thus the ribbons tend to remain flat on the ribbon's common plane. The ribbons are resistant to bending sideways. When bent, one side of the ribbon matrix will be under tension forces and the other side will be under compression forces. If the bending force is too strong or prolonged, the ribbon matrix will be strained, stress or damaged.

However, the tubes where the stacked ribbons are contained generally are round, with a circular cross-sectional shape. To accommodate the rectangular or squared stacks of the ribbons, the tubes need to be sufficiently big, with the diameters not smaller than the longer side of the rectangular or the side of the square. Cross-sectionally, the portions of the circle circumscribed by the rectangular or square become wasted space, in the sense that they increase the overall cable dimensions and increase for the same fibre count. For multi-tube ribbon cables, where a plurality of tubes is contained in a cable, the problem is even more acerbated, as there are more spaces between the tubes.

Therefore, there is a need to provide an optic fiber ribbon cable that increases the total fiber count by utilizing the wasted spaces due to the circumscription of the stack to the tube.

OBJECT OF THE DISCLOSURE

A primary object of the present disclosure is to provide a fiber optic cable with a plurality of bendable optic fiber ribbons.

Another object of this invention is to provide a bendable ribbon conductive to receiving bending forces which can be used in connection with the fiber optic cable with bendable ribbon and increase the fiber count of the cable.

SUMMARY

In an aspect, the present disclosure provides a bendable optic fiber ribbon. The bendable optic fiber ribbon includes a plurality of optic fibers configured for optical communications. In addition, the bendable optic fiber ribbon includes a ribbon matrix. The ribbon matrix includes a first side and a second side. Further, the plurality of optic fibers is disposed in parallel between the first side and the second side along a longitudinal axis of the bendable optic fiber ribbon. The first side includes a plurality of curved surfaces with bending gaps between neighboring curved surface. The bending gaps are configured to reduce at least one of a compression force and a tension force received by the bendable optic fiber ribbon when at least one bending force is applied to said bendable optic fiber ribbon.

In an embodiment of the present disclosure, each of the plurality of optic fibers has a diameter of about 250 μm or 200 microns.

In an embodiment of the present disclosure, a pitch distance in between respective centers of two adjacent optic fibers of the plurality of optic fibers is about 250 μm.

In an embodiment of the present disclosure, the first side of the ribbon matrix includes a top curved side. The top curved side has a cross-sectional shape of periodical waveforms. The shape of the periodical waveforms is selected from a group. The group includes partial circle, triangular, trapezoid and parabolical.

In an embodiment of the present disclosure, the bendable optic fiber ribbon supports a bi-directional bending when the first side and the second side of the ribbons matrix are curved in shape.

In an embodiment of the present disclosure, each fiber of the plurality of optic fibers has a diameter of about 0.210 millimeter. In addition, a distance between the center of fiber and peak of the top curved side of the ribbon matrix is about 0.125 millimeter. Further, a distance between the bottom flat side of the ribbon matrix and the center of fiber is about 0.115 millimeter. Furthermore, the bending gaps between neighboring curved surfaces has an angle of about 6.94 degree.

In an aspect, the present disclosure provides a bendable optic fiber ribbon. The bendable optic fiber ribbon includes a plurality of optic fibers configured for optical communications. In addition, the bendable optic fiber ribbon includes a ribbon matrix. The ribbon matrix includes a first side and a second side. Further, the plurality of optic fibers is disposed in parallel between the first side and the second side along a longitudinal axis of the bendable optic fiber ribbon. The first side includes a plurality of curved surfaces with bending gaps between neighboring curved surface. The bending gaps are configured to reduce at least one of a compression force and a tension force received by the bendable optic fiber ribbon when at least one bending force is applied to said bendable optic fiber ribbon. Each optic fiber of the plurality of optic fibers has a diameter of about 0.200 millimeter. In addition, a distance between center of fiber and peak of the top curved side of the ribbon matrix is about 0.125 millimeter. Further, a distance between bottom flat side of the ribbon matrix and the center of fiber is about 0.115 millimeter. Furthermore, the bending gaps between neighboring curved surfaces has an angle of about 6.94 degree.

STATEMENT OF THE DISCLOSURE

In an aspect, the present disclosure provides a bendable optic fiber ribbon. The bendable optic fiber ribbon includes a plurality of optic fibers configured for optical communications. In addition, the bendable optic fiber ribbon includes a ribbon matrix. The ribbon matrix includes a first side and a second side. Further, the plurality of optic fibers is disposed in parallel between the first side and the second side along a longitudinal axis of the bendable optic fiber ribbon. The first side includes a plurality of curved surfaces with bending gaps between neighboring curved surface. The bending gaps are configured to reduce at least one of a compression force and a tension force received by the bendable optic fiber ribbon when at least one bending force is applied to said bendable optic fiber ribbon.

BRIEF DESCRIPTION OF FIGURES

Having thus described the disclosure in general terms, reference will now be made to the accompanying figures, wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Figure 1:
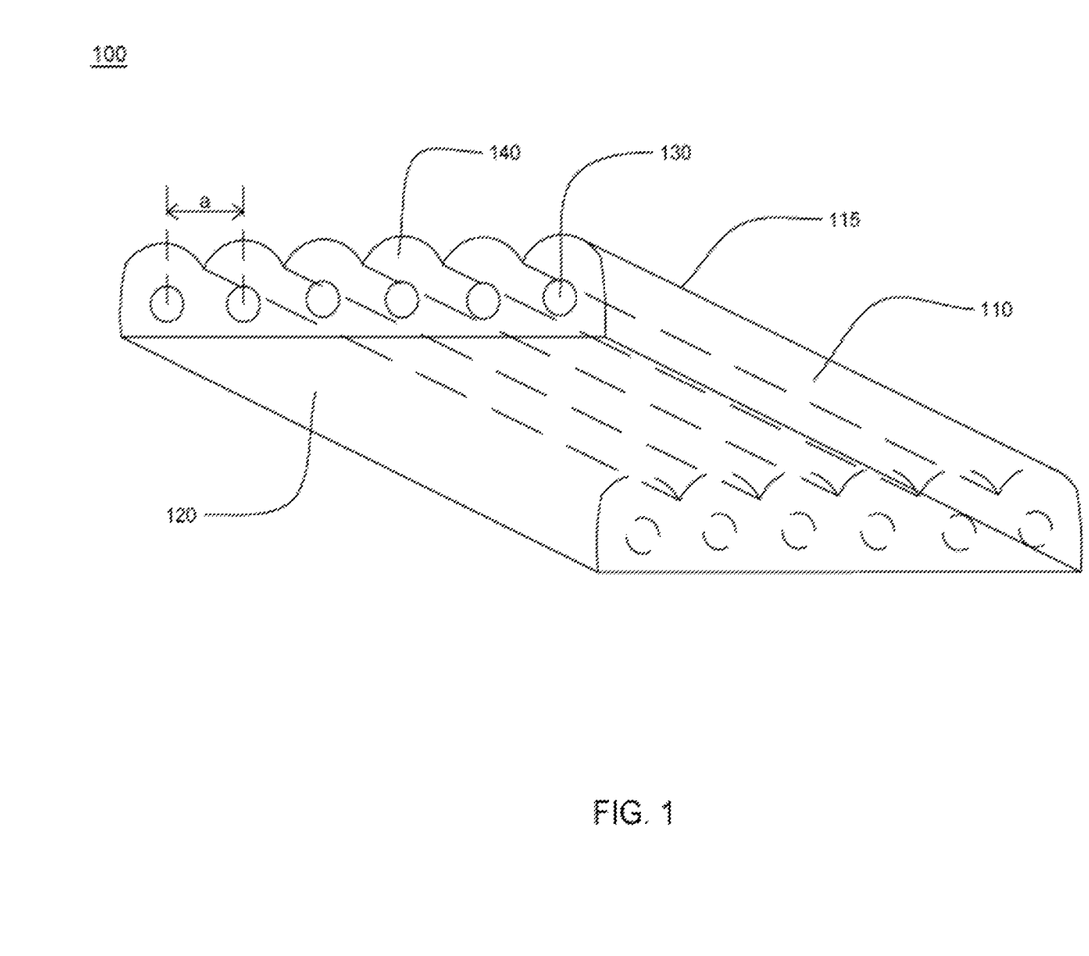
FIG. 1 is a perspective view of the bendable ribbon according to a preferred embodiment of the present invention.

FIG. 1 is a perspective view of the bendable ribbon according to a preferred embodiment of the present invention. Referring to FIG. 1, bendable ribbon 100 comprises a ribbon matrix 110, wherein a plurality of optic fibers 130 is disposed in parallel between a first side and a second side along the longitude axis of the bendable ribbon 100. The ribbon matrix 110 provides structural support and geometrical guide for precisely placing the plurality of optic fibers evenly across the matrix according to industrial standards. The number of the optic fibers within the ribbon matrix 110 may vary, which is usually a number of power of 2, such as 4, 8, etc.

The ribbon matrix 110 comprises the first side and the second side. The first side is a top curved side 115 and the second side is a bottom flat side 120. The top curved side 115 has a cross-sectional shape of a periodical waveform 140. The specific shape of the waveforms 140 can be configured to a variety of waveforms as will be further described in the present invention below. According to the preferred embodiment of the present invention, each of the waveforms 140 is formed over a single fiber with the optic fiber located in the center of the waveform. As such, each optic fiber of the plurality of optic fibers 130 is still sufficiently protected by the ribbon matrix as in prior art. The pitch distance a between the center of neighboring wave forms optic fiber can be configured to any pitch dimension of conventional optic fiber ribbon. As such the bendable ribbons of present invention can be configured to be compatible with any current or future optic fiber ribbon connectors.

Figure 2:
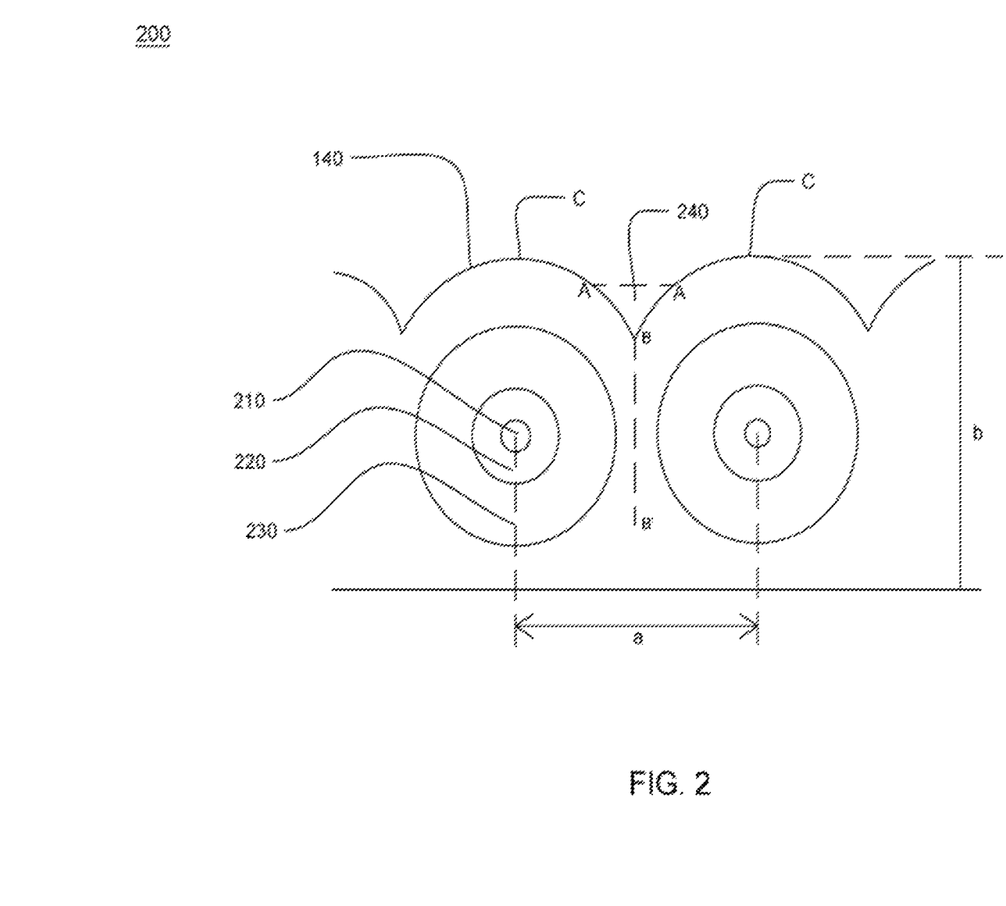
FIG. 2 is close-up cross-sectional view of two neighboring fibers of the bendable ribbon 100 according to a preferred embodiment of the present invention.

FIG. 2 is close-up cross-sectional view of two neighboring optic fibers of the bendable ribbon 100 according to a preferred embodiment of the present invention. Referring to FIG. 2, each of the neighboring fibers comprises several of layers forming concentric circles, including a fiber core 210, a cladding 220 wrapping around the fiber core 210, and an acrylic coating 230, e.g. soft coating and hard coating, wrapping around the cladding 220. There may be other layers and/or components between and/or around the fiber core 210, cladding 220 and coating 230 not illustrated herein. It is to be understood by people of ordinary skill of the art that ribbons having more or less layers/components than illustrated herein are within scope of the present invention. According to a preferred invention of the present invention, the fiber core 210 has a diameter of substantially 9 μm, the cladding 220 has an outer surface to center distance of substantially 125 micrometer (μm), and the coating 230 has an outer surface to center distance of substantially 200-210 micrometer (μm). As illustrated in connection with FIG. 1, a preferred pitch distance (a) between respective centers of two adjacent optic fibers of the plurality of optic fibers (130) is about 250 μm.

Each optic fiber of the plurality of optic fibers 130 has a diameter of about 250 μm or 200 microns. In an embodiment of the present disclosure, each optic fiber of the plurality of optic fibers may have any suitable diameter.

In addition, the distance between the center of the optic fiber 130 and peak of the top curved side 115 of the ribbon matrix 110 is about 0.125 millimeter. Further, the distance between the center of the optic fiber 130 and the flat side 120 of the ribbon matrix 110 is about 0.115 millimeter. Furthermore, the bending gaps between neighboring curved surfaces has an angle of about 6.94 degree.

Figure 3A:
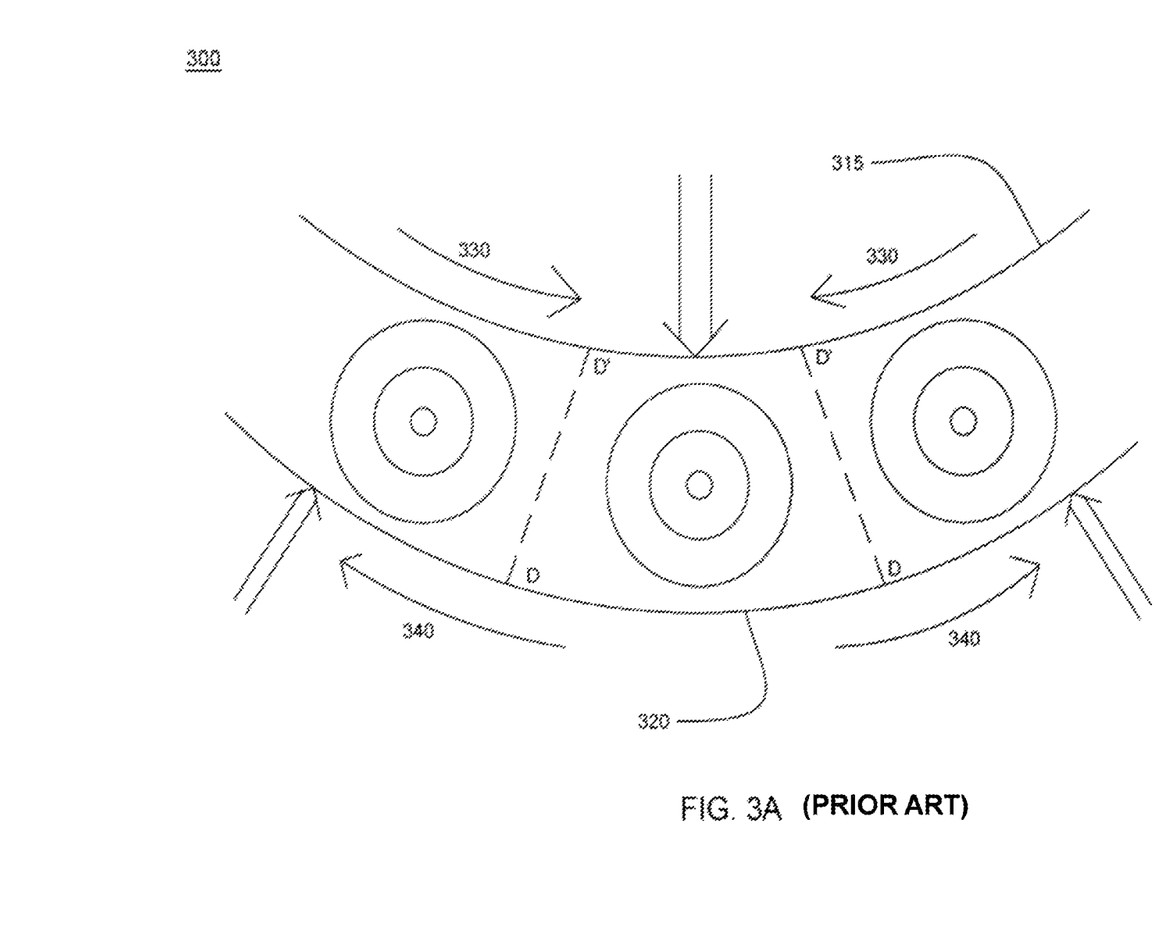
FIG. 3A (prior art) is a cross-sectional view of conventional optic fiber ribbon cable in a bending position.

Further referring to FIG. 2, points C are the peaks of the waveforms 140 are, whereas point B is the valley of between the neighboring waveforms 140. Points A are located on the opposite sides of the surface curves between the peaks C and valley B of each waveform 140. As will be further illustrated below, when the ribbon is bent, the points A on the neighboring waveforms will be closing in to each other across the bending gap 240 in between them, which results in the reduction of structural forces that work to break the ribbon with matrix that do not have the bending gap 240. Alternatively, the ribbon 100 further includes a cut on the ribbon matrix from point B to B'. When the ribbon is not bent or bend from a direction pointing from the bottom side 120 to the curved side 115, the cut between B and B' remain closed. However, when the ribbon is bent from the curved side 115 to the bottom side 120, the cut from B to B' will open up, further extending the bending gap 240 to the point B' as illustrated in FIG. 3C below.

Conventional ribbons may have markings to be labeled or printed on the outside of the ribbon matrix. With a curved side 115, printing or labeling on that side may not be feasible or have a corrugated look hard to read if marked on this side. According to a preferred embodiment of the present invention, the bottom flat side 120 provides a planer side for labeling, printing and other marking means as conventional ribbons. In this regard, the present invention supports cable identification of conventional printing means. Furthermore, the bottom flat side 120 also provides a basis plane during heat stripping and splicing, providing convenience in operations for technicians. As such, the preferred invention supports a bending from the bottom flat side 120 to the curved side 115. According to another embodiment of the present invention, when marking is not a concern or improved marking on curved side 115 is sufficient, both the curved side 115 and the bottom side 120 are curved. This embodiment supports a bi-directional bending to both sides.

The present invention provides advantage over the prior art optic fiber ribbons by having a curved side 115 that facilitates the bending of the optic fiber ribbons without unduly stress the ribbon matrix 110 by reducing the impact of tension and compression forces. This advantage of the present invention will be further illustrated in connection with FIG. 3A (prior art) and FIG. 3B. FIG. 3A (prior art) is a cross-sectional view of conventional optic fiber ribbon cable in a bending position. Referring to FIG. 3A, when the conventional optic fiber ribbon 300 is bent from the sides of the bottom side 320 towards the top side 315 of the ribbon as illustrated in FIG. 3A, and/or bent from the top side 315 to the bottom side 320 in the center, center pointing compression forces 330 will be exerted on the top side 315, whereas peripheral-pointing tension forces 340 will be exerted on the bottom side 320A. The compression forces 330 and tension forces 340 also interact, converging and concentrating on breaking points D's where the ribbon matrix is most prone to be broken. The ribbon matrix may become broken or otherwise damaged if the force is intense or persists. To overcome the disadvantage of the conventional ribbon cable, the present invention proposes the curved top side to reduce the tension and compression forces when bent as illustrated in FIG. 3.

Figure 3B:
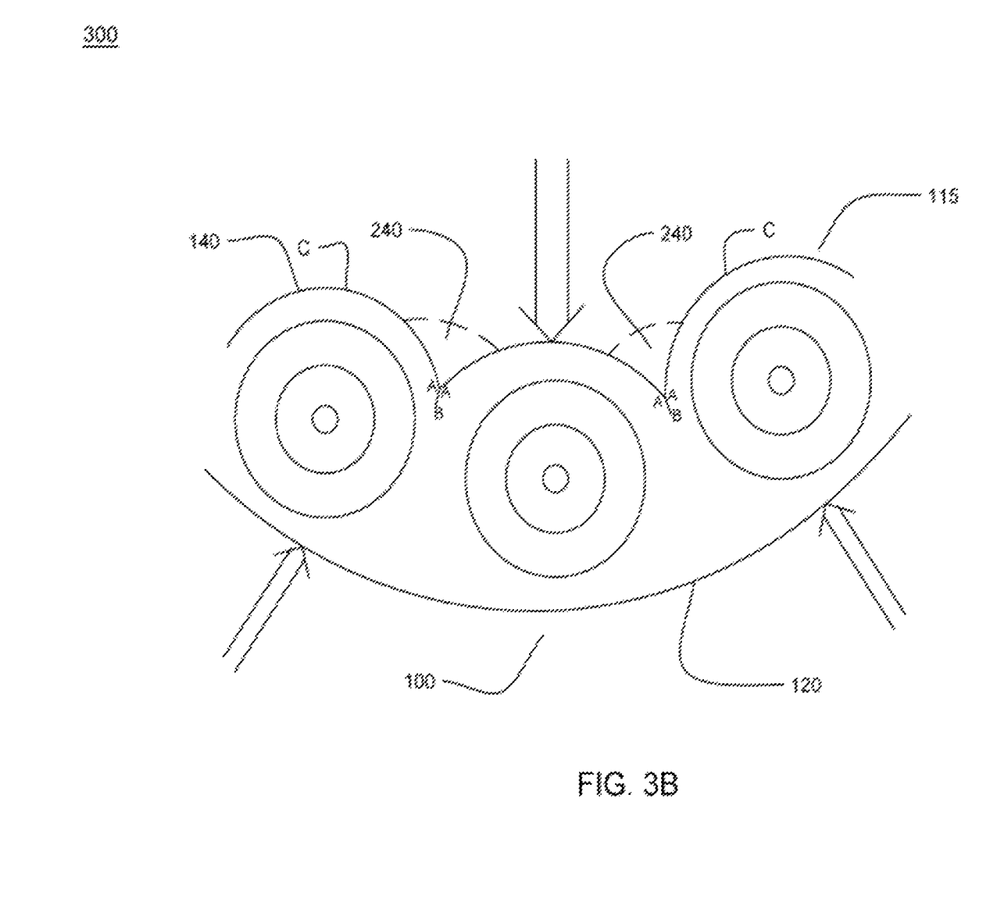
FIG. 3B is a cross-sectional view of the optic fiber ribbon in a bending position according to a preferred embodiment of the present invention.
Figure 3C:
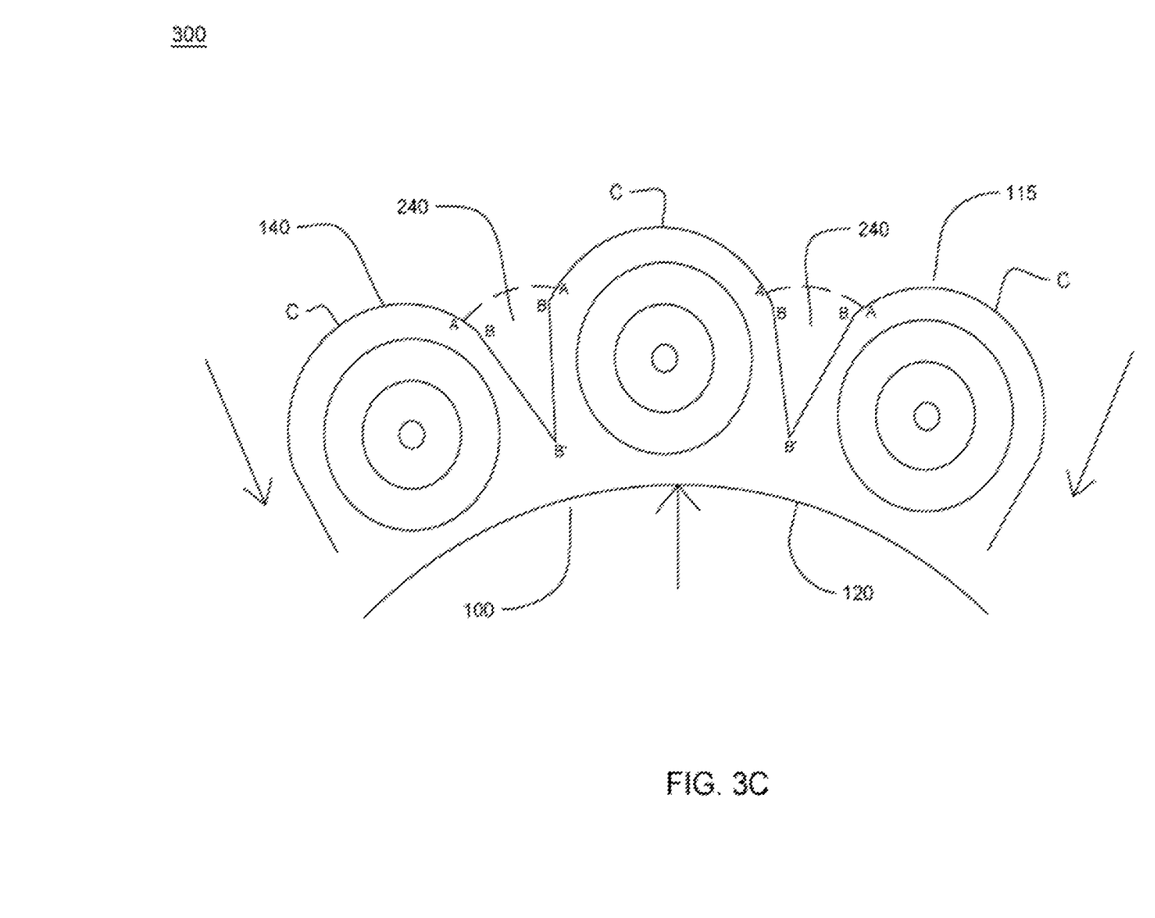
FIG. 3C is a cross-sectional view of the optic fiber ribbon in another bending position according to another preferred embodiment of the present invention.

FIG. 3B is a cross-sectional view of the optic fiber ribbon in a bending position according to a preferred embodiment of the present invention. Now referring to FIG. 3B, the ribbon 100 is in a bending position. The fiber ribbon 100 is bent from the sides of the bottom side 120 towards the top side 115 of the ribbon as illustrated in FIG. 3B, and/or bent from the top side 115 to the bottom side 120 in the center, center pointing compression forces 330 will be exerted on the top side 115, whereas peripheral-pointing tension forces 340 will be exerted on the bottom side 120. As illustrated in FIG. 2 and FIG. 3B, in bending position, bending gaps 240 between the neighboring waveforms 140 starts are pushed together, along the curvature between the valley points Bs and the peak points Cs of the waveforms 140. The curvature provides a guided bending pathway for the bendable ribbon 100. During bending, the neighboring waveforms 140 are "curled" together. The points As on the neighboring waveforms 140 will touch each other. As illustrated herein, the bending gaps 240 are devoid of the materials of the ribbon matrix, resulting in the reduction of the tension and compression forces that would be otherwise created should the space is filled with matrix material as illustrated in FIG. 3A.

FIG. 3C is a cross-sectional view of the optic fiber ribbon in another bending position according to another preferred embodiment of the present invention. Referring to FIG. 3C, the bendable ribbon can be bent in a reverse bend, namely bending in a direction pointing from the curved side 115 to the bottom side 120. The reverse bend may be opted by users in consideration of factors such as the formfactor of the waveforms 140. As illustrated in FIG. 3B, the valley point Bs are pressed during a bending action in the direction shown in FIG. 3B. When the point As are touching each other, the valley point Bs are subject to compression, causing strain of on the ribbon. Depending on the particular curve formed of waveform 140 as further described in connection with FIGS. 4A-4D, the surface along the arcs from points B to A may all subject to more or less compression causing stress and strain of the ribbon. As such, a reverse bend as shown in FIG. 3C maybe more advantageous depending on the material and/or manufacturing process of the ribbon matrix. As shown in FIG. 3C, when the ribbon is bent from the curved side 115 to the bottom side 120, the cut from B to B' will open up, further extending the bending gap 240 from B to point B'. The additional space in the bending gap 240 in FIG. 3C help reduce the reverse bending curve's diameter for similar amount of strain on the structure of the ribbon matrix.

Figure 4A:
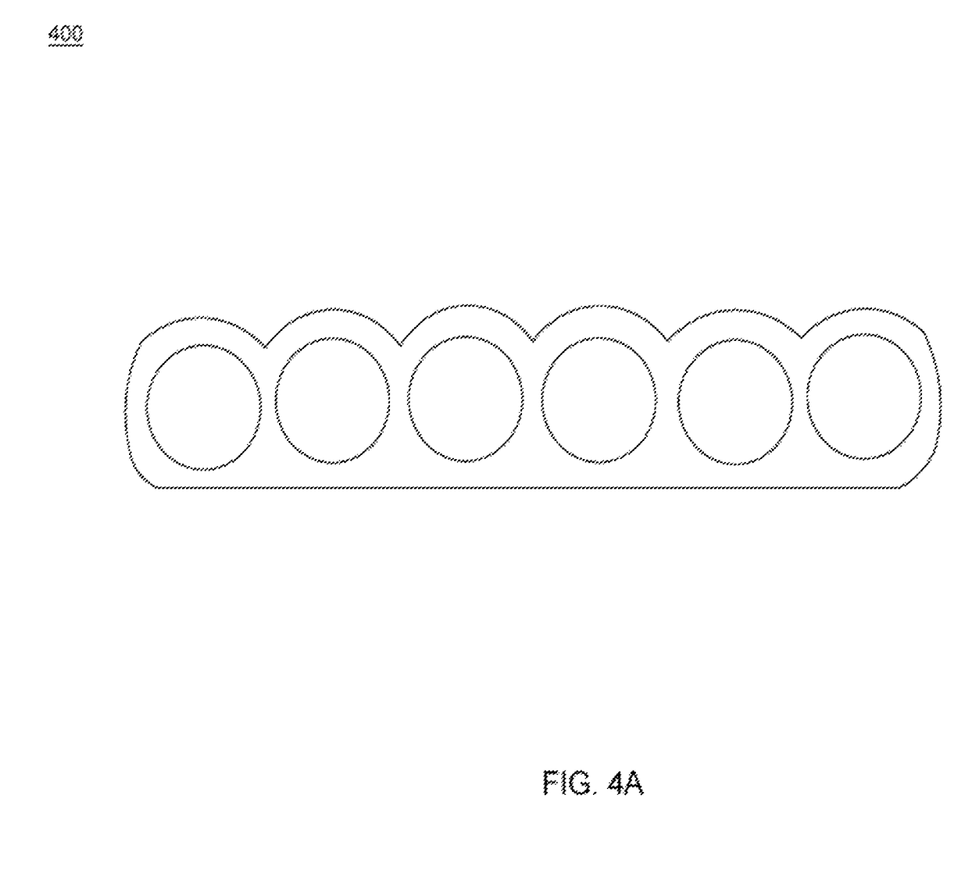
FIG. 4A illustrates an optic fiber ribbon with a waveform according to an embodiment of the present invention.
Figure 4B:
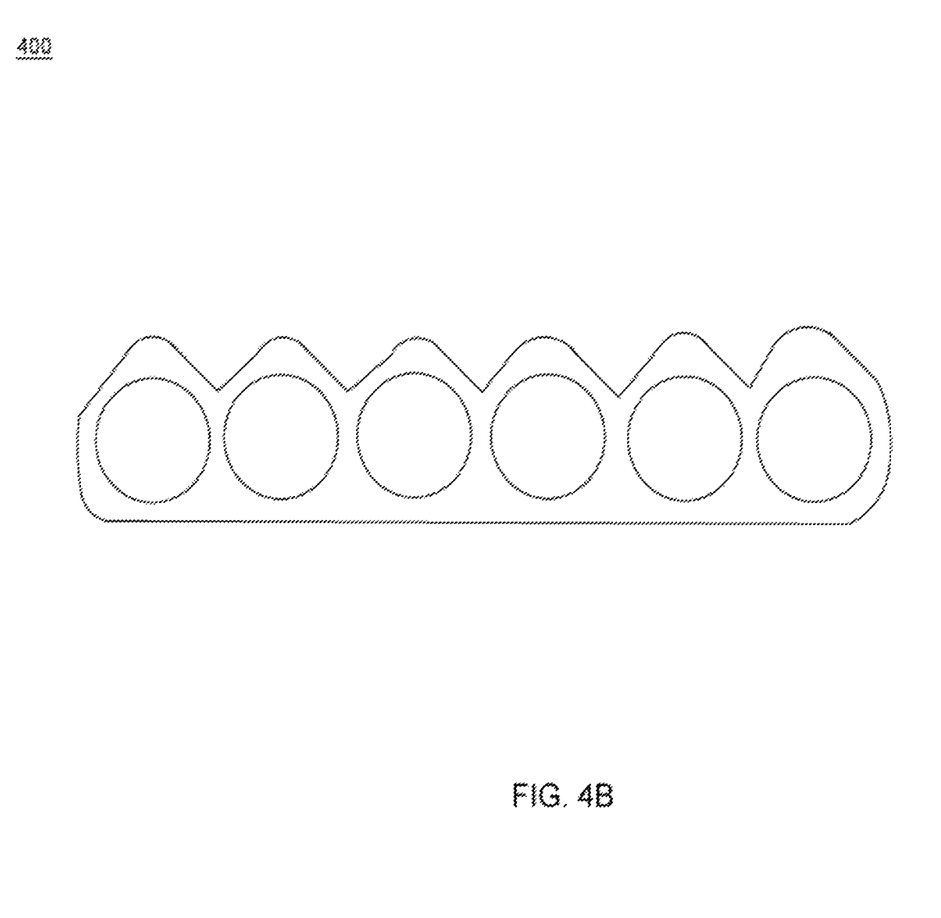
FIG. 4B illustrates an optic fiber ribbon with another waveform according to another embodiment of the present invention.
Figure 4C:
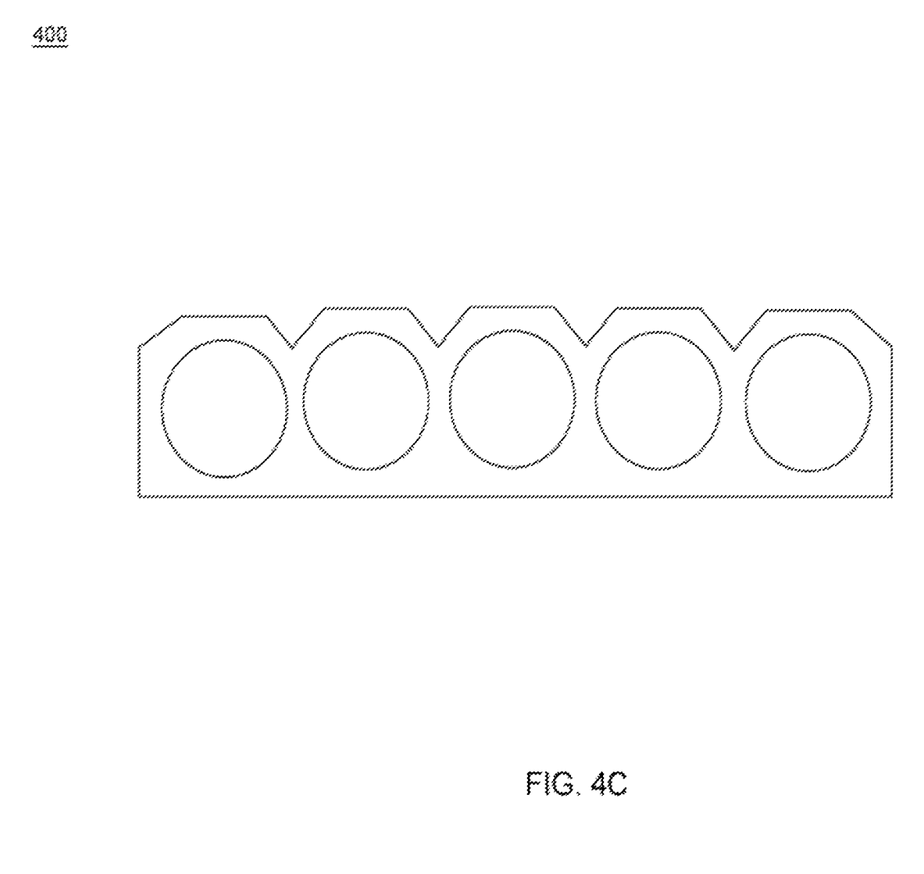
FIG. 4C illustrates an optic fiber ribbon with still another waveform according to yet another embodiment of the present invention.
Figure 4D:
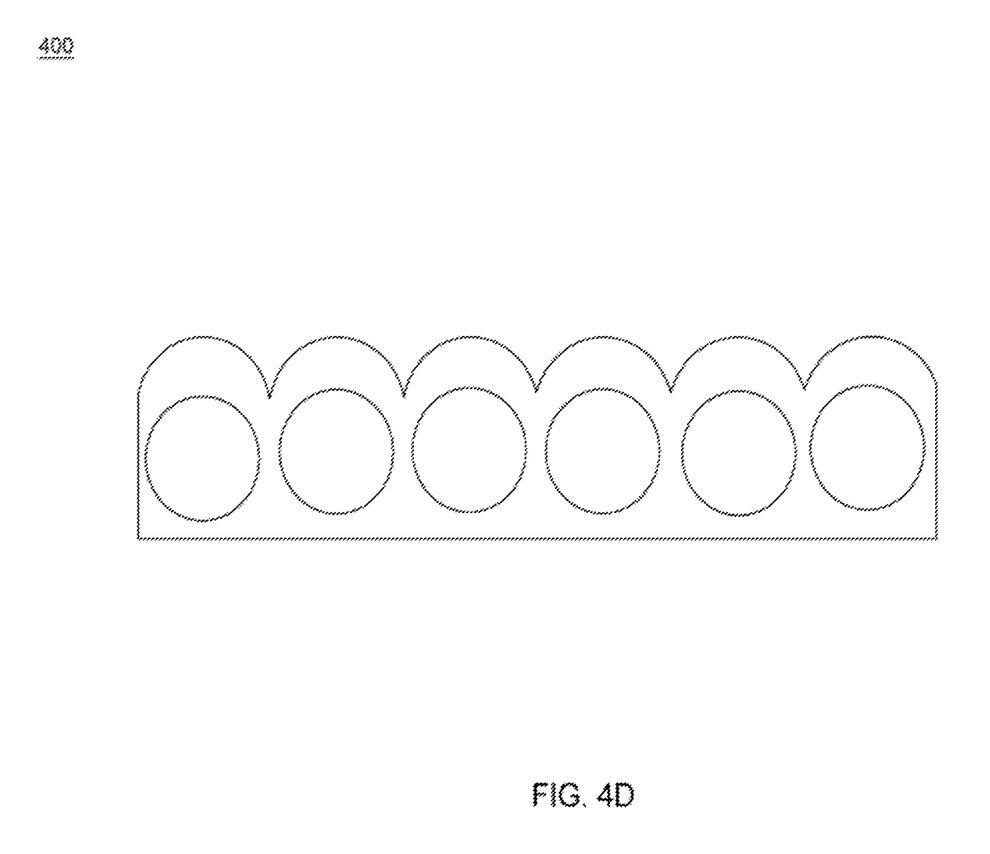
FIG. 4D illustrates an optic fiber ribbon with yet another waveform according to yet another embodiment of the present invention.

The curves of the waveform 140 can be configured of a plurality of curves. FIG. 4A-4D illustrates a plurality of cross-sectional view of the curves of the waveform 140 according to embodiments of the present invention. FIG. 4A illustrates an optic fiber ribbon with the waveform 140 having a cross-sectional view of a partial circle. FIG. 4B illustrates an optic fiber ribbon with the waveform 140 having a cross sectional view of a substantially triangular shape. FIG. 4C illustrates an optic fiber ribbon with the waveform 140 having a cross sectional view of a substantially a trapezoid shape. FIG. 4D illustrates an optic fiber ribbon with the waveform 140 having a cross sectional view of substantially parabolical curves. It is to be understood by people of ordinary skill of the art, the above plurality of embodiments are by way of illustration not limitation. Any other cross-sectional shape of the waveforms 140 that having bending gaps between the neighboring domes that allows the optic fiber ribbon to be bent towards the center is within the scope of the present invention.

Figure 5A:
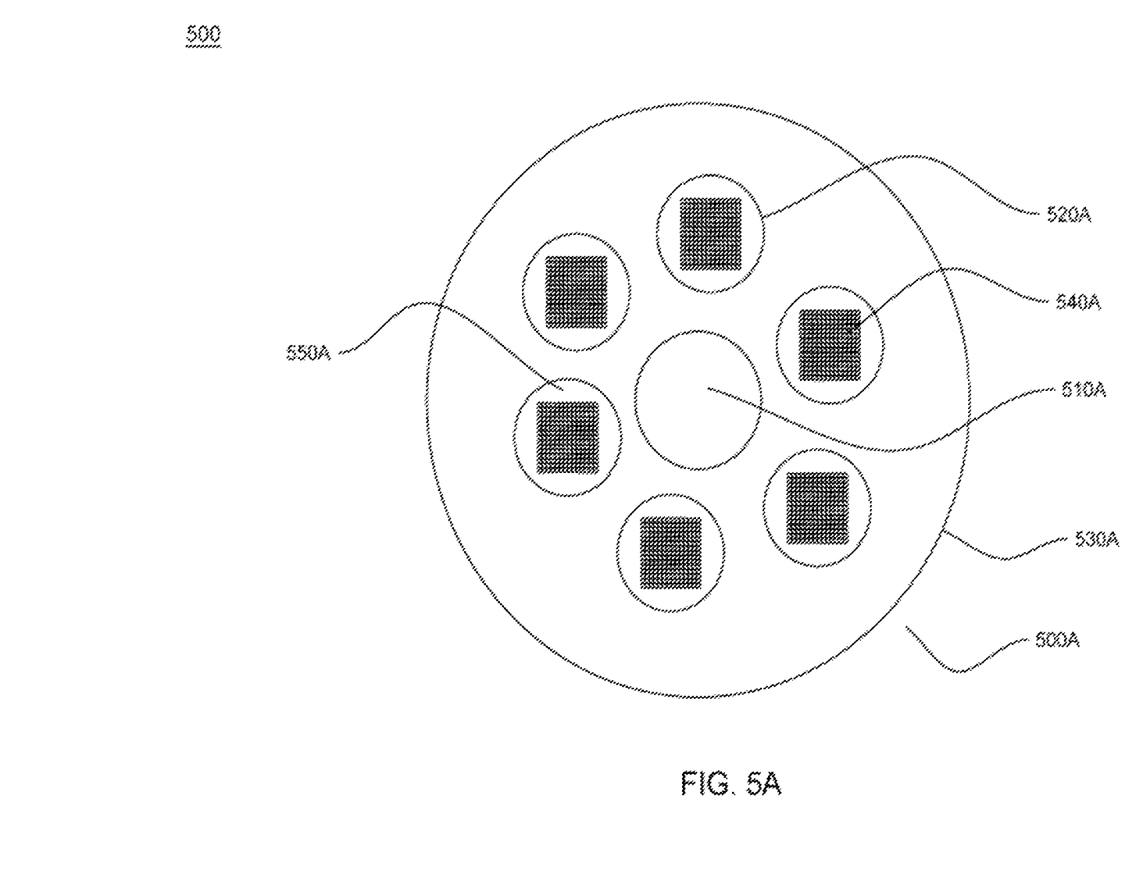
FIG. 5A (prior art) is a conventional multitube single jacket fiber optic cable with ribbons.

The bendable ribbons may be used in connection with ribbon cables to increase the fiber counts of the cable. The optic ribbon cable with bendable ribbon will be illustrated in connection with FIG. 5A and FIG. 5B. FIG. 5A (prior art) is a conventional multitube single jacket fiber optic cable with ribbons 500A. The conventional multitube single jacket fiber optic cable 500A comprises a core 510A, loose tubes 520A and a jacket 530A. Within the loose tubes 520A, a plurality of stacked ribbon 540A is located therein. As is clearly illustrated in FIG. 5A, due to the manner the ribbon cables are stacked, there are empty spaces such 550A within the loose tubes and empty spaces between the loose tubes 520A and the cable jacket 530A. The empty spaces 550A cannot be used for placing more stacked ribbon cables, because of the dimensional limitation, thereby wasting the space and limiting the total fiber counts that the conventional cable 500A may carry.

Figure 5B:
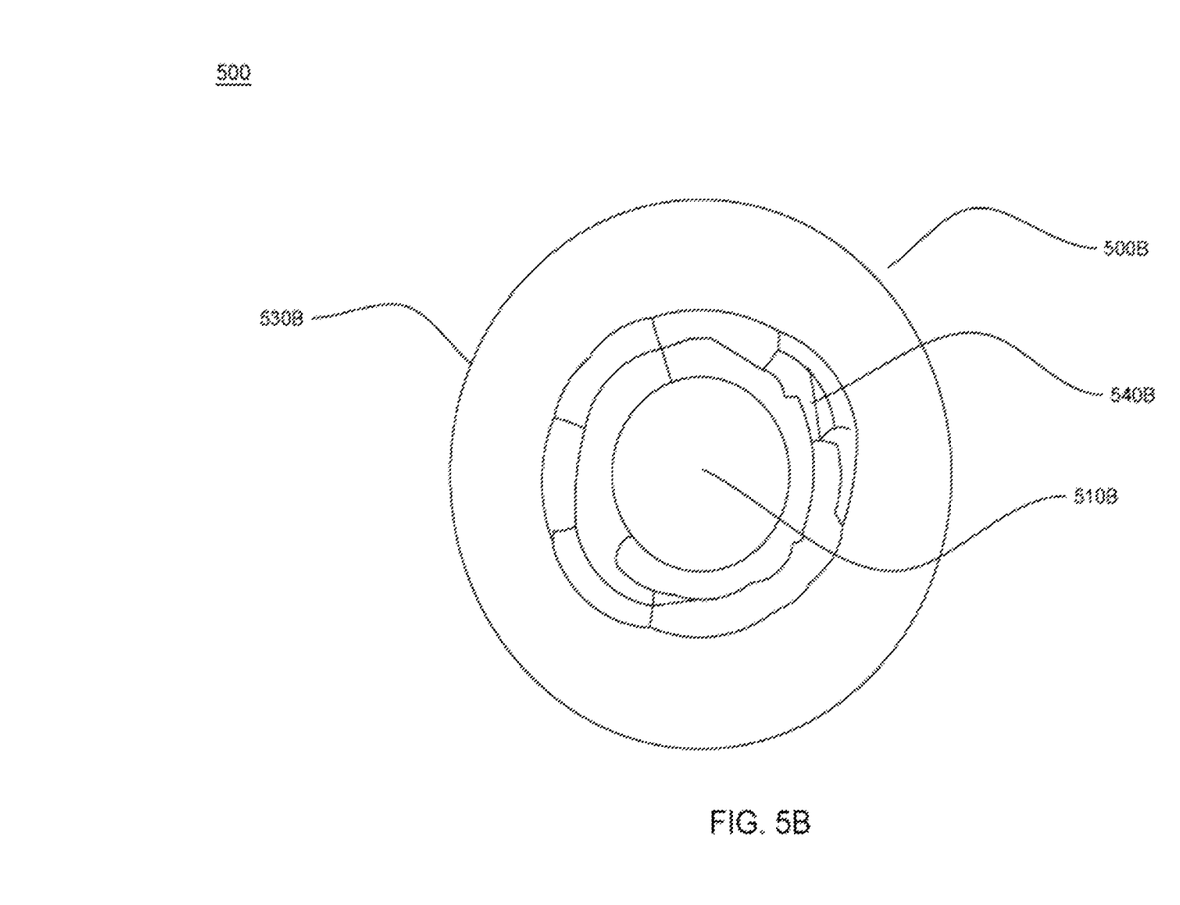
FIG. 5B is a multitube single jacket fiber optic cable with bendable optic fiber ribbon according to a preferred embodiment of the present invention.

FIG. 5B illustrates the multitube single jacket fiber optic cable with bendable optic fiber ribbon according to a preferred embodiment of the present invention. Now referring to FIG. 5B, the fiber optic cable 500B comprises a cable core 510B, a cable jacket 530B and a plurality of bendable optic fiber ribbons 540B. The plurality of bendable optic fiber ribbons 540B is arranged in concentric rings layering on top of each other. Alternatively, the plurality of bendable optic fiber ribbons 540B are arranged in a spiral manner (not shown), with the plurality of optic fiber ribbon 540B located side-by-side to each other and generally circling the core 510B. As such, the plurality of the optic fiber ribbons 540B fills the space between the cable core 510B and the cable jacket 530B in a geometrically tighter manner compared to the conventional cable 500A. The wasted spaces such as 550A and 560A as illustrated in FIG. 5A are thus eliminated. More ribbon optic cables can be accommodated enhancing the total fiber counts a cable can carry.

The above descriptions of the embodiments of the present disclosure are provided for demonstration to persons skilled in the art, instead of exhaustively listing all the embodiments or limiting the present disclosure to a single disclosed embodiment. In view of the above, various replacements and variations to the present disclosure are apparent to persons skilled in the art. Therefore, although some alternative embodiments have been discussed in detail, other embodiments are apparent or can be readily derived by a person skilled in the art. The present disclosure is intended to cover all the replacements, modifications and variations to the present disclosure that have been discussed here as well as other embodiments consistent with the spirit and scope of the present disclosure.

We claim:

1. A bendable optic fiber ribbon, comprising:
a plurality of optic fibers configured for optical communications; and
a ribbon matrix comprising a first side being a curved side and a second side being a bottom flat side, wherein the plurality of optic fibers are disposed in parallel between the first side and the second side along a longitudinal axis of the bendable optic fiber ribbon;
wherein the first side has a cross-sectional shape of a periodical waveform such that points on neighboring waveforms of the first side close in to each other across a bending gap between the neighboring waveforms when at least one bending force is applied to the bendable optical fiber ribbon to bend from the sides of the second side to the first side;
wherein the neighboring waveforms of the first side are jointed at a valley point such that the bending gap between the neighboring waveforms is in the form of a cut, the cut being open when at least one bending force is applied to the bendable optical fiber ribbon to bend the ribbon matrix in a direction pointing from the first side to the bottom side.

2. The bendable optical fiber ribbon of claim 1, wherein each of the plurality of optical fibers has a diameter of 250 micrometer ($\mu m$) or 200 micrometer ($\mu m$).

3. The bendable optical fiber ribbon of claim 1, wherein a pitch distance between respective centers of two adjacent optical fibers of the plurality of optical fibers is 250 micrometer ($\mu m$).

4. The bendable optical fiber ribbon of claim 1, wherein the first side of the ribbon matrix has a cross-sectional shape of periodical waveforms, wherein the shape of the periodical waveforms is selected from a group, wherein the group comprises partial circle, triangular, trapezoid and parabolical.

5. The bendable optical fiber ribbon of claim 1, wherein the bendable optical fiber ribbon supports a bi-directional bending when the first side and the second side of the ribbon matrix are curved in shape.

6. The bendable optical fiber ribbon of claim 1, wherein each optical fiber of the plurality of optical fibers has a diameter of 0.210 millimeter, wherein a distance between center of fiber and peak of top curved side of the ribbon matrix is 0.125 millimeter, wherein a distance between the center of fiber and a bottom flat side of the ribbon matrix is 0.115 millimeter, wherein the bending gaps between neighboring curved surfaces has an angle of about 6.94 degree.

7. The bendable optical fiber ribbon of claim 1, wherein when the at least one bending force is applied to the bendable optical fiber ribbon, the bending gaps allow the neighboring curved surface to move closer resulting in the reduction of the at least one of a compression force and a tension force.

8. The beddable optical fiber ribbon of claim 1, wherein the second side is substantially planar.

9. A bendable optical fiber ribbon, comprising:
a plurality of optical fibers configured for optical communications; and
a ribbon matrix comprising a first side and a second side, wherein the plurality of optical fibers is disposed in parallel between the first side and the second side along a longitudinal axis of the bendable optical fiber ribbon, wherein the ribbon matrix joins adjacent optical fibers of a plurality of optical fibers at at least one location along the length of the adjacent optical fibers;
wherein the first side comprises a plurality of curved surfaces with bending gaps between neighboring curved surface, said gaps configured to reduce at least one of a compression force and a tension force received by the bendable optical fiber ribbon when at least one bending force is applied to said bendable optical fiber ribbon, wherein each optical fiber of the plurality of optical fibers has a diameter of 0.100 to about 0.210 millimeter, wherein a distance between center of fiber and peak of top curved side of the ribbon matrix is between 0.050 to 0.125 millimeter, wherein a distance between the center of fiber and bottom flat side of the ribbon matrix is 0.115 millimeter, wherein the bending gaps between neighboring curved surfaces has an angle of 6.94 degree;

wherein the neighboring curved surfaces are jointed at a valley point.

10. The bendable optical fiber ribbon of claim 9, wherein when the at least one bending force is applied to the bendable optical fiber ribbon, the bending gaps allow the neighboring curved surface to move closer resulting in the reduction of the at least one of a compression forces and a tension force.

11. The bendable optical fiber ribbon of claim 9, wherein the second side is substantially planar.

\* \* \* \* \*